United States Patent [19]
Hill

[11] 3,708,027
[45] Jan. 2, 1973

[54] BATCHING SYSTEM UTILIZING DIGITAL-TO-ANALOG SUBTRACTION TO DENOTE THE AMOUNT OF BATCHED MATERIAL

[75] Inventor: John L. Hill, North St. Paul, Mich.

[73] Assignee: Ramsey Engineering Company, St. Paul, Mich.

[22] Filed: Jan. 31, 1972

[21] Appl. No.: 222,185

[52] U.S. Cl..............177/210, 177/70, 177/DIG. 3, 177/164
[51] Int. Cl. .............................................G01g 3/14
[58] Field of Search.....177/60, 70, 210, 164, DIG. 1, 177/DIG. 3

[56] References Cited

UNITED STATES PATENTS

| 3,063,635 | 11/1962 | Gordon | 117/210 UX |
| 3,464,508 | 9/1969 | Engle et al. | 177/60 X |
| 3,576,224 | 4/1971 | Susor | 177/DIG. 1 |

Primary Examiner—George H. Miller, Jr.
Assistant Examiner—George H. Miller, Jr.
Attorney—Stuart R. Peterson

[57] ABSTRACT

A series of pulses from a controlled pulse generator are counted by a counter and the count is converted to a negative analog voltage signal having a value denoting the count. A positive analog voltage signal is provided in accordance with the raw gross weight of a batching hopper. Both analog signals are applied to the non-inverting input of an operational amplifier having a gain of "two." When the values of the two analogs are equal, the amplifier output is zero. The pulse generator is controlled by a comparator that monitors the zero output condition to stop the further production or forwarding of pulses. The counter registers the total weight and the processed analog signal at the amplifier output represents the net weight added to the hopper for each material admission.

11 Claims, 1 Drawing Figure

PATENTED JAN 2 1973    3,708,027
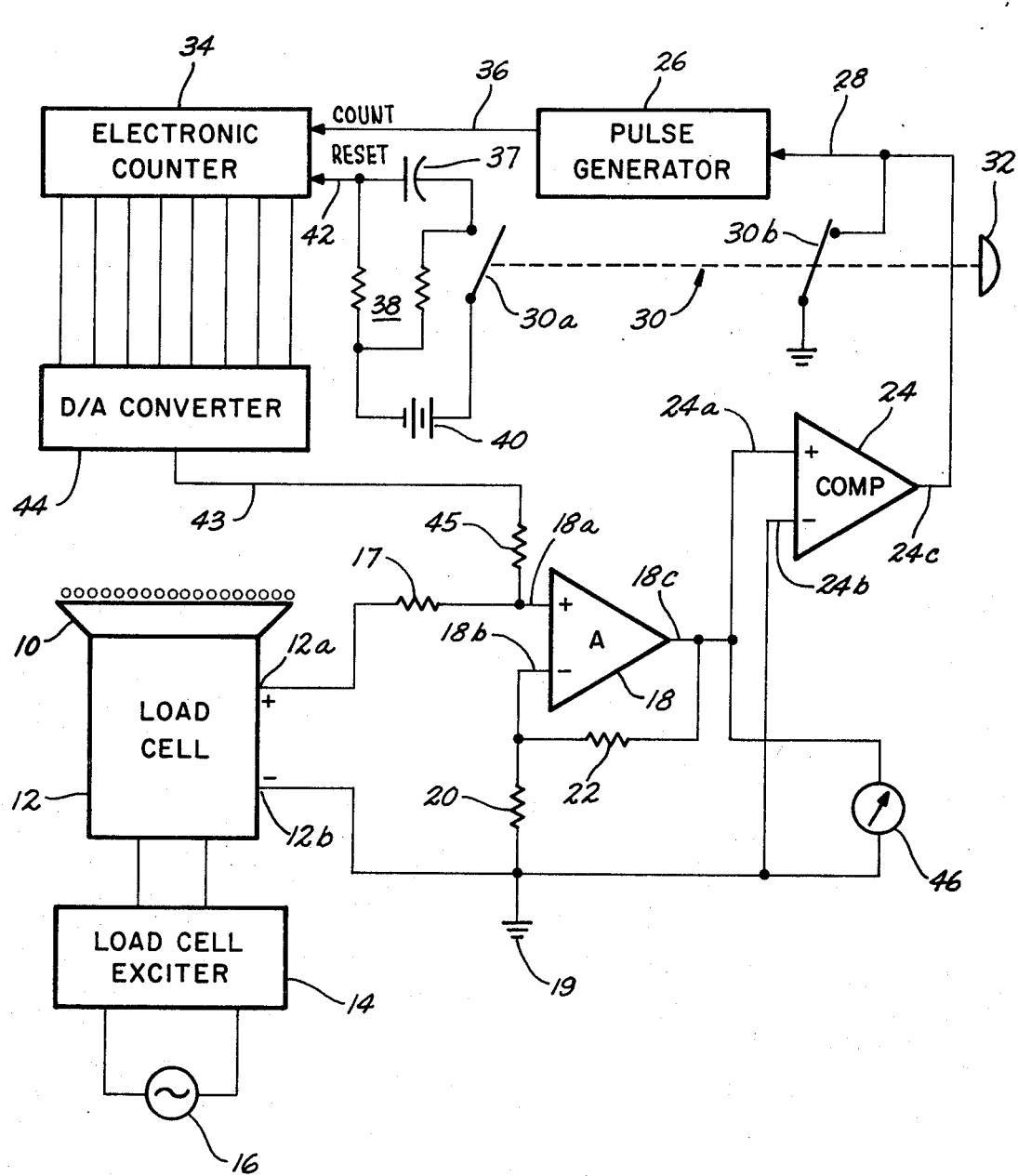

BATCHING SYSTEM UTILIZING DIGITAL-TO-ANALOG SUBTRACTION TO DENOTE THE AMOUNT OF BATCHED MATERIAL

BACKGROUND OF THE INVENTION

1. Field of the Invention

This invention relates generally to weighing, and pertains more particularly to a subtraction procedure for use in denoting the amount of batched material.

2. Description of the Prior Art

The prior art is replete with various methods for determining when the weight of a given material has reached a desired value and then stopping the further admission of that material. Both AC and DC electrical analog signals have been employed. Further, the solution to the problem of either accommodating a "non-zero" empty weight or the presence of a previously admitted material has been achieved by either:

1. adding the analogs of the separate material criteria for comparison to the accumulative actual weight signal, or 2. performing a subtraction operation in which the analog of the already accumulated weight is subtracted from the accumulative weight analog prior to the delivery of the next material.

The latter method involves storing or "remembering" an analog quantity until the delivery of the next material has been completed.

SUMMARY OF THE INVENTION

One object of the invention is to provide a weighing system utilizing greatly simplified circuitry. More specifically, an aim of the invention is to command the re-zeroing of the processed analog signal representing the gross weight of the hopper and contents just prior to commencing the material delivery of the next batch ingredient. In this way, each successive material delivery is accomplished with analog signals equivalent to a weightless empty hopper.

A specific object of the invention is to provide a weighing system utilizing a digital-to-analog conversion technique in which the less accurate procedure of storing a voltage analog is obviated.

Another object of the invention is to provide a weighing system for batching apparatus in which there is a complete lack of any "carry-over" error from one material to the next, this being heretofore an intrinsic error characteristic with methods of adding criteria analogs.

Another object is to provide a weighing system of the foregoing character that will be fast acting and truly representative of a changing weight condition.

Yet another object is to provide a registration of the total weight contained in a batching hopper and in addition to allow tracking of the increase in weight for a particular batch. Stated somewhat differently, it is an aim of the invention to produce electrical signals representing weight increases in the batching hopper without regard for the actual weight already present. Also, the invention has for an aim the provision of an accurate indication of the gross weight contained in the hopper at any given time.

Briefly, the invention makes use of an analog voltage signal that varies in accordance with the gross weight of a batching hopper. Through the agency of a controlled pulse generator, an electronic counter counts the series of pulses received from the pulse generator and a digital-to-analog converter changes the accumulated number of pulses in the counter to an analog voltage signal having a polarity opposite to that of the gross weight analog voltage signal. The two analog signals are presented through respective resistors to the non-inverting input terminal of an operational amplifier. Consequently, when the two analog voltage signals are equal, then the amplifier output will be zero. By using a comparator to sense this zero condition, the pulse generator can be stopped when a sufficient number of pulses are delivered to the counter. The output of the operational amplifier provides a processed analog signal which is indicative of any increase in the gross weight of the batching hopper, doing so without regard for whatever weight has previously been placed in the hopper. In other words, the processed analog signal is representative of the net weight of material added, and is independent of the tare weight of the empty hopper or the gross weight of a partially filled hopper.

BRIEF DESCRIPTION OF THE DRAWING

The sole figure exemplifying the invention is a combined electrical schematic and block diagram illustrating the weighing system in conjunction with a batching hopper.

DESCRIPTION OF THE PREFERRED EMBODIMENT

Referring now to the drawing, a batching hopper has been denoted by the reference numeral 10. Conventionally, the batching hopper 10 is supported on a load cell 12 which is powered from an exciter 14, the exciter being energized by an alternating current source labeled 16. It will be appreciated that the load cell 12 provides a direct current analog voltage signal at its output terminals 12a, 12b representative of the gross weight of the batching hopper 10, the terminal 12a being positive and the terminal 12b being negative or at ground potential as shown in the drawing.

As will be discerned from the drawing, the gross weight analog signal from the load cell is presented through a resistor 17 to an operational amplifier 18, more specifically the non-inverting input terminal 18a thereof. The other input terminal, assigned the reference numeral 18b is connected to the junction of resistors 20 and 22. The amplifier 18 has an output terminal which has been labeled 18c.

Although the function performed by a comparator 24 will not be fully explained at this stage of the description, nonetheless it is to be observed that a first input terminal 24a of the comparator 24 is connected directly to the output terminal 18c of the operational amplifier 18, whereas the second input terminal 24b is connected to circuit common 19. The comparator will produce a high output voltage of one polarity or the other depending on the polarity, but not the magnitude, of its input voltage. In the embodiment shown, the output voltage will be in the range of 12 to 15 volts positive whenever the voltage at input terminal 24a is more positive that that at terminal 24b by as little as 50 microvolts. The output voltage will be negative for inputs of the opposite polarity.

At this time, attention is directed to a controlled pulse generator 26, there being a control line 28 connecting the output terminal 24c of the comparator 24 to the generator 26. All that need be understood at the present is that the comparator 24, which monitors the zero output condition of the operational amplifier 18, forces the control line 28 leading to the pulse generator 26, positively whenever the voltage at terminal 18c is more positive than a few microvolts, thereby stimulating the production of pulses, except, of course, when a contact 30b is closed to prevent this action.

A switch unit 30, which can be manually actuated by a knob 32 has a normally open contact 30a and the above-mentioned normally closed contact 30b. When closed, the contact 30b connects the control line 28 to ground; when open, the contact 30b permits the voltage appearing at the comparator output terminal 24c to control the generation of pulses.

A multi-stage electronic counter 34 is shown connected to the pulse generator 26 by means of a line 36. In this way, the series of pulses produced by the pulse generator 26 are forwarded over the line 36 to counter 34 which counts the pulses and provides a registration indicative of the total number of pulses received. As is typical, the counter 34 has a reset provision in the form of a reset circuit 38 that need not be described in detail. However, it does include a voltage supply 40 and a reset line 42. When the contact 30a is closed, a single reset pulse is provided via the line 42 to reset the counter 34 to its zero state. A second reset cannot be achieved until after the capacitor 37 has become discharged by opening the contact 30a.

Of importance in practicing the invention is a digital-to-analog converter 44 which provides a negative-going output voltage having a value representative of the number of pulses registered in the counter 34. It should be now recognized that this negative voltage provided on lead 43 by the converter 44 permits the input of amplifier 18 to be set to zero (as has been previously described), for any value of weight on the load cell within the range of the counter 34 and the converter 44.

The circuit shown at the input and output of the operational amplifier 18, including resistors 17, 20, 22 and 45 constitutes a "non-inverting" voltage amplifier whose output is established as follows:

$$E_o = \frac{e_i(R_{20} + R_{22})}{R_{20}}$$

where $E_o$ represents the output voltage appearing between terminal 18c and the circuit common 19, and $e_i$ represents the input voltage appearing between terminal 18a and the circuit common.

In the example shown, resistors 17 and 45 are made equal to each other, and resistors 20 and 22 are also equal to each other for ease of explanation; however, this relationship is not essential to the correct operation of the circuit.

Under the conditions of equality of the resistor values, equal voltages of opposite polarity applied to resistors 17 and 45 results in a zero voltage at their junction, the input terminal 18a, and thereby a zero output voltage at the output terminal 18c. All these voltages are measured with the circuit common as the reference terminal.

With the condition described obtaining, one half of any change of voltage at the output terminal of the load cell 12a will appear as a departure from zero at the amplifier input terminal 18a, and the full value of the change will appear at the output terminal 18c. This is true because the operational amplifier will produce an output in this circuit which will maintain a negligible voltage difference between the input terminals 18a and 18b.

Although the resistor relationships chosen for the illustration establish an inflexible relationship among the several voltage values, it should be recognized that other voltage relationships may be accommodated by an appropriate selection of the resistor values.

Inasmuch as the output voltage at the terminal 18c of the amplifier 18 after the zeroing operation has been performed is representative of any increase in the voltage of the raw gross analog signal furnished by the load cell 12, it represents the net weight of the material added to the hopper since the most recent re-zeroing operation. Accordingly, a measuring instrument 46, such as a voltmeter, may be connected between the terminal 18c and the circuit common 19 to indicate the resulting net weight of the material in the hopper. It should be recognized that the meter 46 denotes only the increase in weight and does not depend in any sense of the word on the tare weight of the empty hopper 10 nor does it depend in any way on the gross weight when the hopper 10 is partially filled provided that a re-zeroing operation has been executed after the partial filling took place. It should be noted that the contacts 30a and 30b are operated only for a short interval, and are then restored to the positions shown. Such operation constitutes a re-zeroing of the processed analog signal.

OPERATION

Although the operation of the measuring system herein disclosed is believed obvious from the information already given, nonetheless a brief outline of what occurs should be beneficial in providing a full appreciation of what transpires. Accordingly, the switch 30 is actuated for a short interval by way of the knob 32 so as to close the switch contact 30a and at the same time open the contact 30b. Closure of the contact 30a provides a reset pulse over the line 42 which returns or resets the electronic counter 34 to its zero state. The opening of the contact 30b removes the ground potential that has up to this point prevented the control line 28 from responding to the output signal from the comparator.

If the processed analog signal is positive, the pulse generator 26 is allowed to furnish pulses to the counter 34 where they are counted and the converter 44 converts the pulse count to a negative analog voltage signal which increases in magnitude as the count advances. This voltage is applied to the resistor 45 to restore the input voltage at terminal 18a to zero as has been described.

Inasmuch as the analog voltage signal from the load cell 12, which is indicative of the weight in the batching hopper 10, is also connected to the input terminal 18a, the analog voltage from the converter 44 is effectively subtracted from whatever voltage is provided by the load cell 12. As the count accumulates, the output of the converter 44, as already indicated, increases negatively and ultimately this results in a voltage equal and opposite to that of the voltage from the load cell 12, the voltage from the load cell 12 being the raw gross analog signal. When this happens, the processed analog signal, which is the signal between the output terminal 18c and the circuit common 19, becomes zero, and the comparator stops the further production of pulses on line 36. At this time the contacts 30 may be restored to their original state.

It should be distinctly noted, that although the voltage at all three terminals of the amplifier 18 becomes zero, at later times, when the pulse generator is held inoperative, any increase in output voltage of the load cell will produce an increase of half that magnitude at the non-inverting terminal 18a of the amplifier 18. Hence, any such increase will produce double this increase in the output signal which appears at the terminal 18c. Therefore, the processed analog signal will track the increase in the raw gross analog signal and this is the net weight measured by the meter 46.

In summary, it should be apparent that in a batching system, wherein successive materials are admitted to a single weighing hopper, operation of the zeroing contacts prior to the admission of the first material will produce a non-deteriorating analog of the weight of the empty hopper in the digital-to-analog converter which is effectively subtracted from the accumulating gross weight thereby presenting to any indicating or control mechanism a true analog of the net amount of the first material entering the weighing hopper. Prior to the admission of the second material, a second operation of the zeroing contacts will restore the analog output to zero, and the observation and control of the admission of the second material will be on a true net weight basis, the intrinsic subtraction function of the circuit having eclipsed the combined weight of the hopper and the first material. The operation may be repeated for additional materials up to the limit of the electronic counter and the digital-to-analog converter capacity.

An important advantage of this method of processing the analog of the weight of the hopper and its contents is that the related analogs specifying the amounts of the several materials may all have one terminal in common, and can therefore be derived from a single potential source. A further advantage lies in the fact that a set of analogs so derived can be simply altered by adjusting the magnitude of the source to vary the amount of the completed batch without affecting the relative proportions of each material.

A further advantage is that the subtrahend is maintained in digital form, although it is utilized in analog form, and therefore it will not deteriorate with time. Furthermore, this digital representation of the subtrahend represents the gross weight of the hopper and its content, and may be displayed or recorded after the admission of each material.

Still another advantage of this invention is that the error of admission of one material does not carry-over to affect the amount of material admitted subsequently as is the case when analogs of each separate material are summed for comparison with the analog of the gross weight as is done in many of the prior art systems.

I claim:

1. A weighing system comprising a weighing hopper, means for providing a first analog voltage signal in accordance with the weight of said hopper and the material contained therein, means for producing a series of pulses, an electronic counter for registering the number of pulses forwarded from the pulse producing means, a digital-to-analog converter for converting the count registration of said counter to a second analog voltage signal having a value representative of said registration, and means for discontinuing the forwarding of pulses to said counter when the value of said second analog voltage signal has reached a predetermined relation with the value of said first analog voltage signal.

2. A weighing system as defined in claim 1 in which said predetermined relationship is reached when the value of said first analog signal is substantially equal to the value of said second analog signal.

3. A weighing system as defined in claim 2 in which said first analog signal is of one polarity and said second analog signal is of opposite polarity.

4. A weighing system as defined in claim 3 in which said pulse discontinuing means includes an operational amplifier having a pair of input terminals and an output terminal, said means for providing a first analog signal and said converter being connected to one of said input terminals so that when said first and second analog signals are equal the output signal at said output terminal is zero.

5. A weighing system as defined in claim 4 in which said pulse discontinuing means additionally includes a comparator having a first input terminal connected to the output terminal of said operational amplifier, a second input terminal connected to the other input terminal of said operational amplifier, and an output terminal connected to said pulse producing means.

6. A weighing system as defined in claim 5 including a first resistor connected between said means for providing a first analog signal and a second resistor connected between said converter and the said one input terminal of said operational amplifier.

7. A weighing system as defined in claim 5 in which said pulse producing means includes a controlled pulse generator, and a common switch means for starting said pulse generator and simultaneously resetting said counter.

8. A weighing system as defined in claim 5 in which said operational amplifier has a gain greater than "one."

9. A weighing system as defined in claim 8, in which said gain is equal to "two."

10. In combination, a weighing hopper, a load cell having first and second output terminals providing an analog voltage signal in accordance with the weight of said hopper and the material contained in said hopper, an operational amplifier having first and second input terminals and an output terminal, a first resistor connected between the first output terminal of said load cell and the first input terminal of said operational amplifier, the second input terminal of said amplifier being connected to the second output terminal of said load cell, a comparator having first and second input terminals and an output terminal, the first input terminal of said comparator being connected to the output terminal of said operational amplifier and the second input terminal of said comparator being connected to the second output terminal of said load cell and also to the second input terminal of said amplifier, a pulse generator connected to the output terminal of said comparator and controlled thereby, an electronic counter connected to said pulse generator for counting the pulses received therefrom, a digital-to-analog converter for converting the count of said electronic counter to an analog signal representative of the count, and a second resistor connected between the output of said converter and said first input terminal of said operational amplifier.

11. The combination defined in claim 10 including switch means for resetting said counter to its zero state and also for simultaneously starting said pulse generator, said pulse generator providing pulses to said counter until a zero difference between the first and second input terminals of said comparator causes a signal to appear at its said output terminal which stops said pulse generator.

* * * * *

UNITED STATES PATENT OFFICE
CERTIFICATE OF CORRECTION

Patent No. 3,708,027　　　　　　　　　　Dated January 2, 1973

Inventor(s) John L. Hill

It is certified that error appears in the above-identified patent and that said Letters Patent are hereby corrected as shown below:

Front page under [75] Inventor:, "Mich." should be --Minn.--; same page, under [73] Assignee:, "Mich." should be --Minn.--. Column 2, line 63, "that" (first occurrence) should be --than--.

Signed and sealed this 22nd day of May 1973.

(SEAL)
Attest:

EDWARD M. FLETCHER, JR.　　　　　　ROBERT GOTTSCHALK
Attesting Officer　　　　　　　　　　Commissioner of Patents